United States Patent
Oshiba et al.

(10) Patent No.: US 8,345,563 B2
(45) Date of Patent: Jan. 1, 2013

(54) WIRELESS COMMUNICATION SYSTEM, DATA TRANSMISSION METHOD FOR UPLINK THEREOF, BASE STATION DEVICE, AND MOBILE STATION DEVICE

(75) Inventors: Shigeomi Oshiba, Tokyo (JP); Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1222 days.

(21) Appl. No.: 12/068,082

(22) Filed: Feb. 1, 2008

(65) Prior Publication Data

US 2008/0186916 A1 Aug. 7, 2008

(30) Foreign Application Priority Data

Feb. 5, 2007 (JP) ................................ 2007-025874

(51) Int. Cl.
*H04W 4/00* (2009.01)
*H04W 72/00* (2009.01)
*H04J 3/00* (2006.01)
*H04J 1/16* (2006.01)
*H04B 7/208* (2006.01)
*H04B 7/00* (2006.01)
*H04B 1/38* (2006.01)

(52) U.S. Cl. ........ 370/252; 370/330; 370/336; 370/344; 370/348; 455/450; 455/509; 455/522; 455/561

(58) Field of Classification Search .......... 370/328–349, 370/252; 455/450–452.2, 509, 522
See application file for complete search history.

(56) References Cited

U.S. PATENT DOCUMENTS

| | | | |
|---|---|---|---|
| 6,631,124 B1* | 10/2003 | Koorapaty et al. | 370/337 |
| 2005/0157803 A1* | 7/2005 | Kim et al. | 375/260 |
| 2007/0217388 A1* | 9/2007 | Shiizaki et al. | 370/349 |
| 2007/0265017 A1* | 11/2007 | Ishii et al. | 455/453 |
| 2008/0159323 A1* | 7/2008 | Rinne et al. | 370/431 |
| 2009/0303937 A1* | 12/2009 | Sawahashi et al. | 370/329 |

FOREIGN PATENT DOCUMENTS

| | | |
|---|---|---|
| CN | 1387707 A | 12/2002 |
| WO | WO 01/33742 A1 | 5/2001 |
| WO | WO 2006/134946 A1 | 12/2006 |

OTHER PUBLICATIONS

3GPP TS 36.211 ver. 0.3.0 (Physical Channels and Modulation (Release 8)), 2006.
3GPP TS 36.300 ver. 0.1.0. (Overall description Stage 2 (Release x)), 2006.
Chinese Office Action dated May 30, 2011 with an English translation.
Japanese Office Action dated Oct. 4, 2011 with a partial English translation.

\* cited by examiner

*Primary Examiner* — Alpus H Hsu
*Assistant Examiner* — Jeremy Costin
(74) *Attorney, Agent, or Firm* — McGinn IP Law Group, PLLC

(57) ABSTRACT

A wireless base station sends transmission parameters that specify a control signal coding rate and a data signal coding rate which satisfy a BLER (Block Error Rate) required for a control signal and a data signal in a TTI (Transmit Time Interval) scheduled in response to a transmission request from a mobile station. In the specified TTI, the mobile station applies the coding rates, included in the transmission parameters and specified for the control signal and the data signal, to the control signal and the data signal, time-division multiplexes the coded control signal and coded data signal to generate constant transmission-power transmission data, and sends the generated transmission data to a wireless base station via PUSCH.

11 Claims, 7 Drawing Sheets

| TEMPORARY CODING RATE (DBS/TxBS) | CONTROL SIGNAL CODING RATE (CBS/CCBS) |
|---|---|
| $0 \leq$ DBS/TxBS $<$ RdatTh_1 | Rctrl_1 |
| RdatTh_1 $\leq$ DBS/TxBS $<$ RdatTh_2 | Rctrl_2 |
| ... | |
| RdatTh_x-1 $\leq$ DBS/TxBS $<$ RdatTh_x | Rctrl_x |
| ... | |
| RdatTh_n-1 $\leq$ DBS/TxBS $<$ RdatTh_n | Rctrl_n |

FIG. 4

| TEMPORARY CODING RATE (DBS/TxBS) | CONTROL SIGNAL CODING RATE (CBS/CCBS) |
|---|---|
| $0 \leq DBS/TxBS < RdatTh\_1$ | Rctrl_1 |
| $RdatTh\_1 \leq DBS/TxBS < RdatTh\_2$ | Rctrl_2 |
| ... | |
| $RdatTh\_x{-}1 \leq DBS/TxBS < RdatTh\_x$ | Rctrl_x |
| ... | |
| $RdatTh\_n{-}1 \leq DBS/TxBS < RdatTh\_n$ | Rctrl_n |

FIG.5

| TEMPORARY CODING RATE (DBS/TxBS) | CONTROL SIGNAL CODING RATE (CBS/CCBS) |
|---|---|
| $0 \leq$ DBS/TxBS $<$ RdatTh_1 | Rctrl_m_1 |
| RdatTh_1 $\leq$ DBS/TxBS $<$ RdatTh_2 | Rctrl_m_2 |
| ... | |
| RdatTh_x-1 $\leq$ DBS/TxBS $<$ RdatTh_x | Rctrl_m_x |
| ... | |
| RdatTh_n-1 $\leq$ DBS/TxBS $<$ RdatTh_n | Rctrl_m_n |

FIG.7

| INDEX | CONTROL SIGNAL CODING RATE (Rctrl_x) |
|---|---|
| 0 | Rctrl_1 |
| 1 | Rctrl_2 |
| ... | ... |
| n | Rctrl_n |

WIRELESS COMMUNICATION SYSTEM, DATA TRANSMISSION METHOD FOR UPLINK THEREOF, BASE STATION DEVICE, AND MOBILE STATION DEVICE

REFERENCE TO RELATED APPLICATION

This application is based upon and claims the benefit of the priority of Japanese patent application No. 2007-025874, filed on Feb. 5, 2007, the disclosure of which is incorporated herein in its entirety by reference thereto.

FIELD OF THE INVENTION

The present invention relates to a wireless communication system, a data transmission method for an uplink thereof, a base station device, and a mobile station device, and more particularly to a wireless communication system, a data transmission method for an uplink thereof, a base station device, and a mobile station device in which the control signal may be time-division multiplexed (hereinafter called TDM) with the data signal.

BACKGROUND OF THE INVENTION

The standardization organization 3GPP (3rd Generation Partnership Project) has stated a work item called LTE (Log Term Evolution) to study a wireless access method, which is higher in data-rate transmission, short in delay, and packet-transmission oriented, as a successor of the third-generation mobile communication method such as W-CDMA or HSDPA/HSUPA (see Non-Patent Document 1 and Non-Patent Document 2).

The target communication speed of LTE is 100 Mbps-1 Gbps for the downlink, and 50 Mbps for the uplink. In LTE, the candidate for the FDD (Frequency Division Duplex) wireless method is OFDMA (Orthogonal Frequency Division Multiplexing) for the downlink, and SC-FDMA (Single Carrier Frequency Division Multiple Access) for the uplink. The use of those wireless methods requires the wireless base station to perform adaptive scheduling in both the frequency domain and the time domain.

If data is left stagnant in the transmission buffer in a mobile station on the uplink on which data is transmitted via SC-FDMA, the mobile station requests the wireless base station to allocate uplink resources. The wireless base station performs adaptive scheduling at a TTI (Transmit Time Interval), and sends the transmission permission signal (Signaling) to the mobile phone at a TTI. Upon receiving the transmission permission, the mobile station sends the data signal at the TTI. The mobile station sends the control signals such as Ack/Nack, CQI (Channel Quality Indicator), and MIMO (Multiple Input Multiple Output) parameter, periodically or at a predetermined timing.

When there is a data signal to be sent, the control signal described above is time-division multiplexed with the data signal on a physical channel called PUSCH (Physical Uplink Shared Channel). As this control signal that is time-division multiplexed, the standardization organization has almost reached a decision that the control information (Data Associated Signal), which is used to notify the transmission parameters of the data signal, be not used.

Non-Patent Document 1

3GPP TS 36.211 ver. 0.3.0 (Physical Channels and Modulation (Release 8))

Non-Patent Document 2

3GPP TS 36.300 ver. 0.1.0 (Overall description Stage 2 (Release x))

SUMMARY OF THE DISCLOSURE

The entire disclosure of Non-Patent Documents 1 and 2 are incorporated herein by reference thereto. The following analyses are given by the present invention.

In the methods described above in which the transmission power is kept constant and the coding rate of the control signal is kept constant during the TTI when the control signal and the data signal are time-division multiplexed, there may happen a case where the reception quality of the control signal cannot be maintained.

In W-CDMA, the power ratio between the data signal and the control signal is made variable in the TTI in order to satisfy the requirements for BLER (Block Error Rate) between the control signal and the data signal. In SC-FDMA, however, there is a problem that making the power ratio variable in the TTI greatly changes the PAPR (Peak to Average Peak Ratio).

In addition, when the control signal and the data signal are time-division multiplexed, there is a need that a wireless base station can demodulate the data signal and the control signal received from a mobile station without using the Data Associated Signal as the control information.

In view of the foregoing, it is an object of the present invention to provide a wireless communication system, a data transmission method for an uplink thereof, a base station device, and a mobile station device that make the transmission power in the TTI constant and ensure the required reception quality of the signals described above when the control signal and the data signal are time-division multiplexed.

According to one aspect of the present invention, there is provided a data transmission method for transmitting data on an uplink from a mobile station to a wireless base station in a wireless communication system through frequency division multiplexing. The data transmission method comprises the steps of specifying, by a wireless base station, a coding rate of a control signal and a coding rate of a data signal for transmission parameters in a TTI (Transmit Time Interval) scheduled in response to a transmission request from a mobile station, the coding rates of the control signal and the data signal satisfying a required reception quality defined for the control signal and the data signal; and applying, by the mobile station, the coding rates to the control signal and the data signal in the specified TTI, time-division multiplexing the coded control signal and the coded data signal to generate constant transmission-power transmission data, and sending the generated data to the wireless base station, the coding rates being included in the transmission parameters and specified for the control signal and the data signal.

According to a second aspect of the present invention, there is provided a wireless communication system having an uplink for transferring data from a mobile station to a wireless base station through frequency division multiplexing as well as a wireless base station device and a mobile station device used in the wireless communication system. The wireless communication system comprises means for specifying, by a wireless base station, a coding rate of a control signal and a coding rate of a data signal for transmission parameters in a TTI (Transmit Time Interval) scheduled in response to a transmission request from the mobile station, the coding rates of the control signal and the data signal satisfying a required reception quality defined for the control signal and the data signal; and means for applying, by the mobile station, the coding rates to the control signal and the data signal in the specified TTI, time-division multiplexing the coded control signal and the coded data signal to generate constant transmission-power transmission data, and sending the generated data to the wireless base station, the coding rates being included in the transmission parameters and specified for the control signal and the data signal.

According to a third aspect of the present invention, there is provided a wireless base station device for use in a wireless communication system having an uplink for transferring data from a mobile station to a wireless base station through frequency division multiplexing, the wireless base station device comprising:

means for specifying a coding rate of a control signal and a coding rate of a data signal for transmission parameters in a Transmit Time Interval, termed TTI hereinafter, scheduled in response to a transmission request from a mobile station, the coding rates of the control signal and the data signal satisfying a required reception quality defined for the control signal and the data signal; wherein the mobile station applies the coding rates to the control signal and the data signal in the specified TTI and time-division multiplexes the coded control signal and the coded data signal to generate and send constant transmission-power transmission data, the coding rates being included in the transmission parameters and specified for the control signal and the data signal.

According to a fourth aspect of the present invention, there is provided a mobile station device for use in a wireless communication system having an uplink for transferring data from a mobile station to a wireless base station through frequency division multiplexing, the mobile station device comprising:

means for applying coding rates to a control signal and a data signal in a Transmit Time Interval, termed TTI hereinafter, specified by transmission parameters received from a wireless base station, time-division multiplexing the coded control signal and the coded data signal to generate constant transmission-power transmission data, and sending the generated data to the wireless base station, the coding rates being included in the transmission parameters and specified for the control signal and the data signal.

The meritorious effects of the present invention are summarized as follows.

In accordance with the present invention, the control signal and the data signal can be time-division multiplexed without degrading the reception quality and increasing the PAPR. The reason is that the present invention maintains the reception quality, not by changing the power in a TTI, but by making the signal coding rates variable.

BRIEF DESCRIPTIONS OF THE DRAWINGS

FIG. 4 is a diagram showing an example of a table used to determine a control signal coding rate (Rctrl) from the data signal size (DBS) before coding and rate matching processing and the transmission data size (TxBS).

FIG. 5 is a diagram showing another example of a table used to determine a control signal coding rate (Rctrl) from the data signal size (DBS) before coding and rate matching processing and the transmission data size (TxBS).

FIG. 7 is a diagram showing an example of a table used to find a control signal coding rate (Rctrl) from an index value.

PREFERRED MODES OF THE INVENTION

The following modes may be exemplified in the present invention.

The wireless base station may specify the coding rate of the control signal based on a size of the data signal before coding included in the transmission parameters. The data transmission method may further comprises the step of:

calculating, by the mobile station, the coding rate of the control signal, specified by the wireless base station, from a transmission data size, specified by the transmission parameters, and the size of the data signal before coding according to a rule known between the mobile station and the wireless base station.

The data transmission method may further comprises the step of: estimating, by the wireless base station, a size of the control signal added to transmission data to calculate the size of the data signal before coding and including the calculated size of the data signal in the transmission parameters for transmission.

The mobile station may calculate a coding rate of each control signal, specified by the wireless base station, from the transmission data size and the size of the data signal before coding according to the rule known between the mobile station and the wireless base station.

The wireless base station may specify the coding rate of the control signal using an index value known between the wireless base station and the mobile station.

Next, preferred exemplary embodiments of the present invention will be described in detail with reference to the drawings. First, the following generally describes a wireless communication system having an uplink for data transfer in the frequency division multiplex method.

Figure 1:
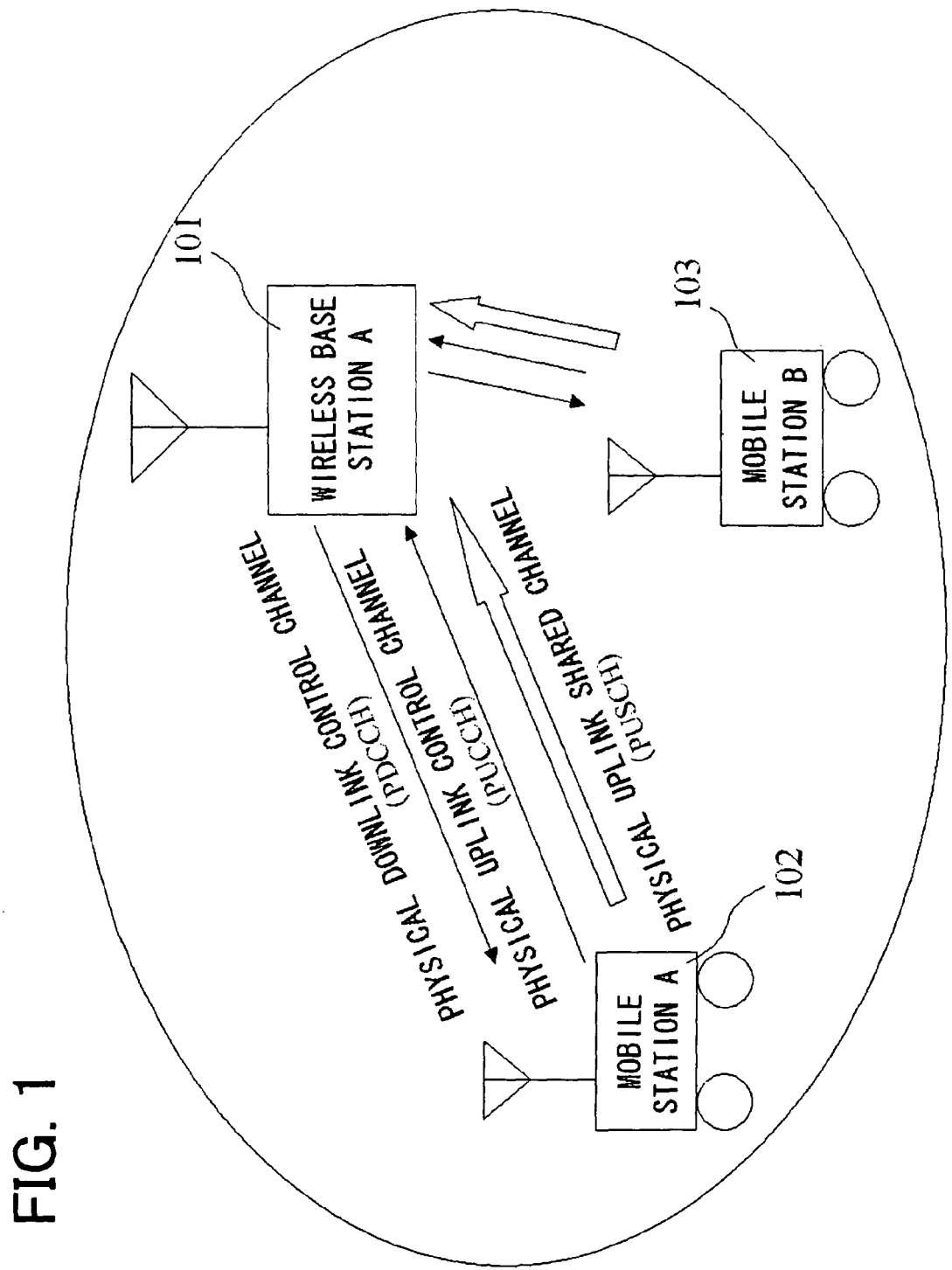
FIG. 1 is a diagram showing the general configuration of a wireless communication system.

FIG. 1 is a diagram showing the general configuration of a wireless communication system. FIG. 1 shows a wireless base station A 101, and a mobile station A 102 and a mobile station B 103 both of which communicate with the wireless base station A 101. Necessary control information is sent and received between the wireless base station A 101 and the mobile station A 102 that communicates with the wireless base station A 101 and between the wireless base station A 101 and the mobile station B 103 that communicates with the wireless base station A 101, each via PDCCH (Physical Downlink Control Channel) and PUCCH (Physical Uplink Control Channel), and upstream data is transmitted via PUSCH (Physical Uplink Shared Channel).

Figure 2:
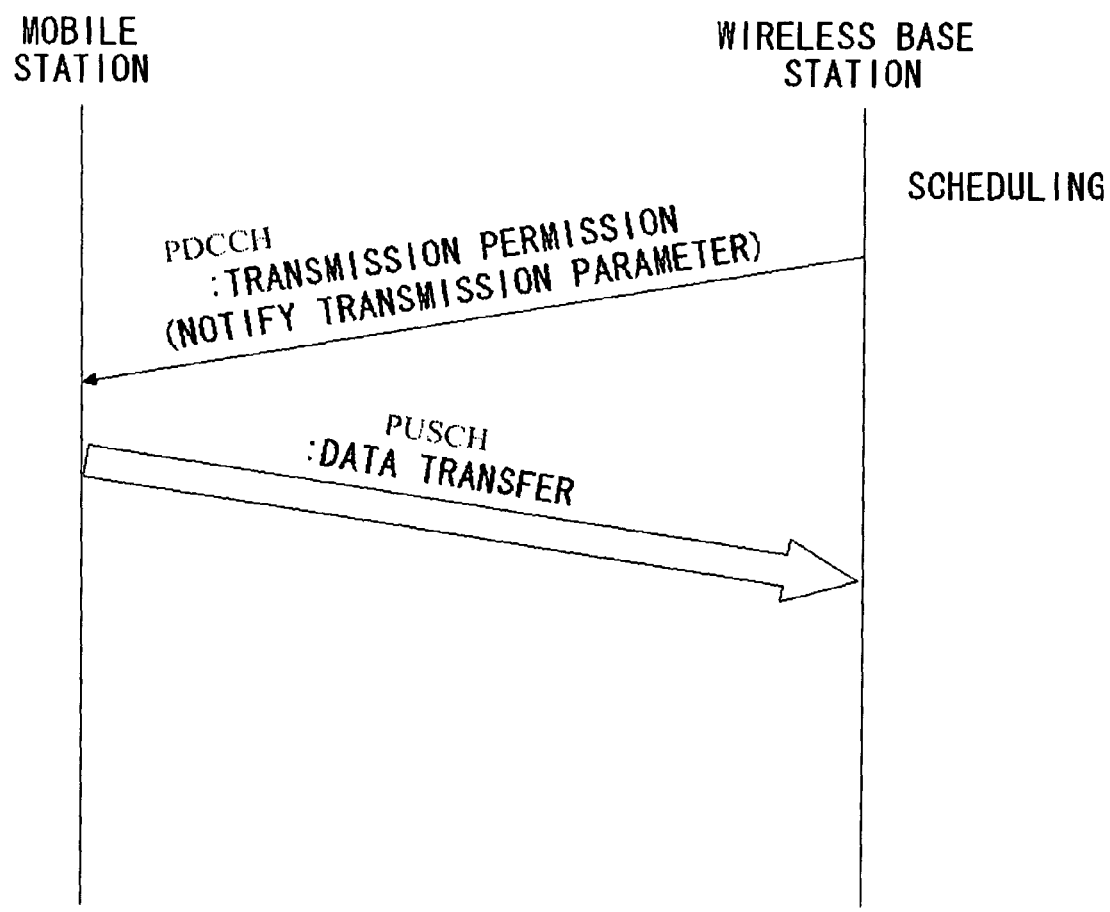
FIG. 2 is a diagram showing the communication sequence between a wireless base station and a mobile station in FIG. 1.

FIG. 2 is a diagram showing the communication sequence between a wireless base station and a mobile station. The wireless base station, which schedules the mobile station, notifies (Signaling) the transmission parameters to the mobile station via PDCCH (Physical Downlink Control Channel).

In response to the transmission parameters via PDCCH, the mobile station, which has data to be sent, time-division multiplexes the data signal with the control signal on PUSCH (Physical Uplink Shared Channel) and sends the multiplexed signal to the wireless base station at an indicated TTI.

In the description of the embodiments below, it is assumed that the number of bits of the control signal (Control Block Size, hereinafter called CBS, before coding and rate matching), transferred during the TTI interval, is obtained by a predefined rule and that the wireless base station and the mobile station know the obtained result.

First Exemplary Embodiment

In a first exemplary embodiment of the present invention, the wireless base station sends the transmission parameter that includes the following: modulation method (Mod_tx) such as BPSK, QPSK, 16QAM, etc., bandwidth (N_tx), PUSCH transmission power value (P_tx) from the mobile station to the wireless base station, and the coding rates of the data signal and the control signal.

This exemplary embodiment is based on the premise that the wireless base station knows the power value (P_UE_Ref) of the reference signal for measuring the quality of the wireless uplink link via which the mobile station sends signals. It is also assumed that the wireless base station can determine the modulation method (Mod_tx) to be assigned and the bandwidth (N_tx) based on the measured reception quality.

First, the wireless base station calculates the data signal coding rate (Rdat) that satisfies BLER (BLER_target_dat) required for the data signal based on the measured reception quality and the determined modulation method (Mod_tx). The calculation of the data signal coding rate (Rdat) can be simplified by referencing the table acquired by the simulation that is performed in advance.

Next, the wireless base station calculates the control signal coding rate (Rctrl) that satisfies BLER (BLER_target_ctrl) required for the control signal based on the measured reception quality and the determined modulation method (Mod_tx). The calculation of the control signal coding rate (Rctrl) can also be simplified by referencing the table acquired by the simulation that is performed in advance.

The data signal coding rate (Rdat) is calculated first because the information amount of the control signal is very much smaller than that of the data signal.

The wireless base station sends the modulation method (Mod_tx), bandwidth (N_tx), transmission data size (TxBS), and PUSCH transmission power value (P_tx), as well as the data signal coding rate (Rdat) and the control signal coding rate (Rctrl) described above, to the mobile station as the transmission parameters.

The mobile station, which receives those transmission parameters, can calculate the control signal size (CCBS) after coding and rate matching from CCBS=CBS/(Rctrl) because the control signal size (CBS) before coding and rate matching is known.

When the control signal size (CCBS) after coding and rate matching is calculated as described above, the mobile station can calculate the data signal size (CDBS) after coding and rate matching because the relation CDBS=TxBS−CCBS holds. Note that the transmission data size (TxBS) can be uniquely calculated using the modulation method (Mod_tx) and the bandwidth (N_tx) included in the transmission parameters.

In addition, when the data signal size (CDBS) after coding and rate matching is calculated, the mobile station can calculate the data signal size (DBS) before coding and rate matching because the DBS=CDBS×(Rdat) holds.

Once the parameters for the data transfer to the wireless base station are determined as described above, BLER required for the signals can be satisfied by making the power in the transmission TTI constant and changing the coding rates applied to the signals.

Figure 3:
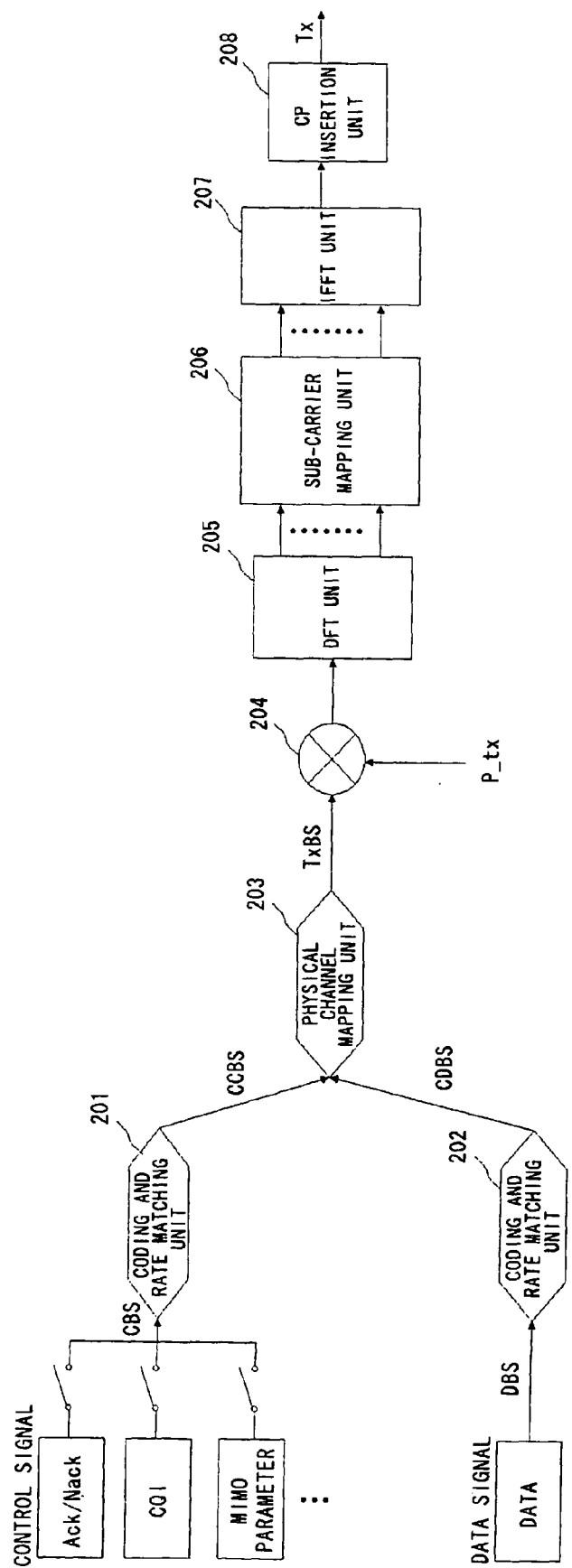
FIG. 3 is a diagram showing the configuration of a transmission data generation processing unit in the mobile station according to the present invention.

FIG. 3 is a diagram showing the configuration of the mobile station that generates transmission data using the transmission parameters acquired as described above. In the TTI, the total sum of transmission bits of the control signal (CBS; Control Block Size), such as Ack/Nack, CQI, and MIMO parameters, is sent to a coding and rate matching unit 201 in which coding and rate matching processing are performed by applying the coding rate (Rctrl) described above (Repetition or Puncturing).

On the other hand, the total sum of transmission bits of the data signal (DBS; Data Block Size) is sent to a coding and rate matching unit 202 in which coding and rate matching processing are performed by applying the coding rate (Rdat) described above (Repetition or Puncturing).

The data (CCBS and CDBS), for which coding and rate matching processing are performed, is time-division multiplexed by a physical channel mapping unit 203. The data size at this time is TxBS (Transmit Block Size), and the following relation holds TxBS=CCBS+CDBS.

After that, a multiplier 204 multiplies the time-division multiplexed data by the power value of P_tx, and a DFT unit 205 performs DFT (Discrete Fourier Transform) to transform the result to frequency domain data. After that, a sub-carrier mapping unit 206 performs sub-carrier mapping, an IFFT unit 207 performs inverse fast Fourier transform to transform the data back to time domain data, and a CP insertion unit 208 adds the CP (Cyclic Prefix) to a predetermined position and transmits the data.

Second Exemplary Embodiment

Next, the following describes a second exemplary embodiment in which the wireless base station sends the transmission parameters that include the data signal size (DBS) before coding and rate matching processing, instead of the data signal coding rate and the control signal coding rate, for reducing the overhead of the transmission parameters.

This exemplary embodiment makes use of the fact that the information amount of the control signal is very much smaller than that of the data signal and, so, the temporary coding rate (DBS/TxBS), calculated from the data signal size (DBS) before coding and rate matching processing and the transmission data size (TxBS), can be approximated to the actual data signal coding rate (DBS/CDBS), that is, (DBS/TxBS≈DBS/CDBS).

If each of the wireless base station and the mobile station finds a unique control signal coding rate (Rctrl) based on the temporary coding rate (DBS/TxBS) described above, the necessary transmission parameters can be prepared without transmitting the data signal coding rate and the control signal coding rate.

FIG. 4 is an example of a table for finding the control signal coding rate (Rctrl) from the temporary coding rate (DBS/TxBS) which is calculated from the data signal size (DBS) before coding and rate matching processing and the transmission data size (TxBS). RdatTh_x (x is a natural number equal to or smaller than n) indicates a threshold for determining the control signal coding rate from the temporary coding rate (=DBS/TxBS).

The control signal coding rate Rctrl_x (x is a natural number equal to or smaller than n) in FIG. 4 is the control signal coding rate (CBS/CCBS) that satisfies BLER (BLER_target_ctrl) required for the control signal. More specifically, the control signal coding rate can be obtained by performing simulation in advance as in the first embodiment and, in general, the control signal coding rate is set so that Rctrl_1<Rctrl_2<...<Rctrl_n.

As in the first embodiment, the transmission data size (TxBS) can be calculated as a unique value using the modulation method (Mod_tx) and the bandwidth (N_tx) included in the transmission parameters. The mobile station references the table, shown in FIG. 4, based on DBS/TxBS to determine the control signal coding rate Rctrl_x, calculates CBS/Rctrl_x to find the control signal size (CCBS) after coding and rate matching, and calculates TxBS-CCBS to find the data signal size (CDBS) after coding and rate matching processing. In this way, the mobile station identifies all necessary transmission parameters.

When the transmission parameters are calculated, it is also desirable that the wireless base station determine the data signal size (DBS) before coding and rate matching processing with consideration for the control information coding processing which is performed on the mobile station based on the control signal coding rate Rctrl_x (effect caused by the control information size). Determining the data signal size (DBS) in this way increases the data transmission efficiency.

Third Exemplary Embodiment

Next, the following describes a third exemplary embodiment of the present invention in which the change made by the second exemplary embodiment is applied and, in addition, a different coding rate is applicable to each control signal.

FIG. 5 shows an example of a table used to find the coding rate (Rctrl_m) of each control signal m based on the temporary coding rate (DBS/TxBS) that is calculated from the data signal size (DBS) before coding and rate matching and the transmission data size (TxBS). That is, the table equivalent to the one shown in FIG. 4 is prepared for each of the control signals, such as Ack/Nack, CQI, and MIMO parameters, and the coding rate Rctrl_m_x that satisfies the BLER required for each control signal is set in the table.

The total sum (CCBS) of the control signals after coding processing is calculated as follows. CCBS=Σ(CCBS_m)=Σ (CBS™/Rctrl_m) (where, m=1-N: N is the total number of independent control signals).

The method for determining the coding rate of each piece of control information is defined as described above between the mobile station and the wireless base station. In this exemplary embodiment, the mobile station references the table, shown in FIG. 5, to determine the control signal coding rate Rctrl_m_x corresponding to DBS/TxBS, uses CBS/Rctrl_m_x to calculate the control signal size (CCBS=Σ(CBS_m/Rctrl_m_x)) after coding and rate matching, and uses TxBS-CCBS to calculate the data signal size (CDBS) after coding and rate matching processing. In this way, the mobile station identifies all necessary transmission parameters.

Figure 6:
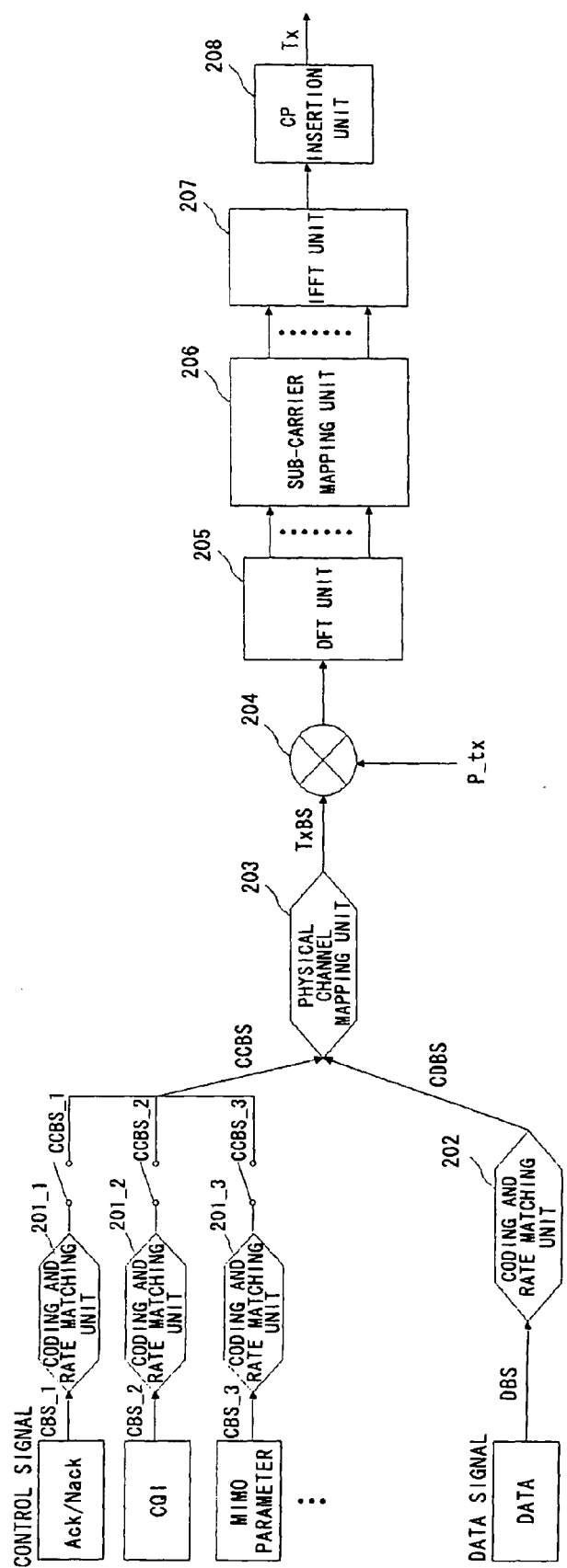
FIG. 6 is a diagram showing another configuration of the transmission data generation processing unit of the mobile station according to an example of the present invention.

FIG. 6 is a diagram showing the mobile station configuration for generates transmission data using the transmission parameters obtained as described above. The configuration shown in this figure differs from the configuration shown in FIG. 3 in that coding and rate matching units (201_1-201_3) are provided, one for each control signal.

This exemplary embodiment improves the data transfer reception quality without increasing the amount of transmission parameter information also when control signal coding is performed independently for each control signal so that the BLER required for each control signal is satisfied.

Fourth Exemplary Embodiment

Next, the following describes a fourth exemplary embodiment in which the wireless base station sends the transmission parameters, which include an index indicating the control signal coding rate instead of the data signal coding rate, the control signal coding rate, and the data signal size (DBS) before coding and rate matching processing, for reducing the overhead of the transmission parameters.

First, the wireless base station calculates the control signal coding rate (Rctrl), which satisfies the BLER (BLER_target_ctrl) required for the control signal, as in the first and second embodiments described above.

Next, the wireless base station references a table, such as the one shown in FIG. 7, to find an index corresponding to the calculated control signal coding rate (Rctrl) and notifies the index to the mobile station as one of the transmission parameters.

The mobile station also references the table, such as the one shown in FIG. 7, to find the control signal coding rate (Rctrl) corresponding to the notified index and, in this way, identifies all necessary transmission parameters as in the exemplary embodiments described above.

A small number of indexes is enough. Sending the control signal coding rate as an index in this way further decreases the overhead of the transmission parameters. In addition, this exemplary embodiment eliminates the need for the sharing of the table used in the second and third embodiments, making the transmission parameter determination algorithm more flexible.

In this exemplary embodiment, the index values may be changed dynamically with the TTI to change the BLER required for the control signal and the data signal as needed.

While the preferred exemplary embodiments of the present invention have been described, various modifications may be made therein without departing from the spirit or scope of the invention that sets the coding rates for ensuring the required reception quality and sends the coding rates as transmission parameters, instead of changing the transmission power ratio between the control signal and the data signal.

For example, though the required BLER is implemented by referencing the table shared by the wireless base station and the mobile station in the second and third exemplary embodiments described above, a modification is also possible in which the wireless base station and the mobile station have tables that implement the required BLER that are different to each other and the table to be referenced (required BLER) is specified by the transmission parameters.

Although BLER (Block Error Rate) is used as the reception quality parameter in the exemplary embodiments described above, other equivalent reception quality parameters may also be used.

It should be noted that other objects, features and aspects of the present invention will become apparent in the entire disclosure and that modifications from the disclosed exemplary embodiments may be done without departing the scope of the present invention claimed as appended herewith.

Also it should be noted that any combination of the disclosed and/or claimed elements, matters and/or items may fall under the modifications aforementioned.

What is claimed is:

1. A data transmission method for transmitting data on an uplink from a mobile station to a wireless base station in a wireless communication system through frequency division multiplexing, said data transmission method comprising:
   specifying, by a wireless base station, coding rates including a coding rate of a control signal and a coding rate of a data signal for transmission parameters in a Transmit Time Interval (TTI) scheduled in response to a transmission request, said coding rates of the control signal and the data signal satisfying a required reception quality defined for the control signal and the data signal; and
   applying, by a mobile station transmitting the transmission request, the coding rates to the control signal and the data signal in the TTI to generate a coded control signal and a coded data signal, time-division multiplexing the coded control signal and the coded data signal to generate constant transmission-power transmission data, and sending the generated constant transmission-power transmission data to said wireless base station, said coding rates being included in the transmission parameters and specified for the control signal and the data signal, wherein said wireless base station specifies the coding rate of the control signal based on a size of the data signal before coding included in the transmission parameters, said data transmission method further comprising:

calculating, by said mobile station, the coding rate of the control signal, specified by said wireless base station, from a transmission data size, specified by the transmission parameters, and the size of the data signal before coding according to a rule known between said mobile station and said wireless base station, and estimating, by said wireless base station, a size of the control signal added to transmission data to calculate the size of the data signal before coding and including the calculated size of the data signal in the transmission parameters for transmission.

2. The data transmission method as defined by claim 1, wherein the control signal comprises a plurality of control signals, and wherein said mobile station calculates a coding rate of each control signal of the plurality of control signals, specified by said wireless base station, from the transmission data size and the size of the data signal before coding according to the rule known between said mobile station and said wireless base station.

3. The data transmission method as defined by claim 1, wherein said wireless base station specifies the coding rate of the control signal using an index value known between said wireless base station and said mobile station.

4. A wireless communication system having an uplink for transferring data through frequency division multiplexing, said wireless communication system comprising:

specifying means for specifying coding rates including a coding rate of a control signal and a coding rate of a data signal for transmission parameters in a Transmit Time Interval (TTI) scheduled in response to a transmission request, said coding rates of the control signal and the data signal satisfying a required reception quality defined for the control signal and the data signal; and applying means for applying the coding rates to the control signal and the data signal in the TTI to generate a coded control signal and a coded data signal, time-division multiplexing the coded control signal and the coded data signal to generate constant transmission-power transmission data, and sending the generated constant transmission-power transmission data to said specifying means, said coding rates being included in the transmission parameters and specified for the control signal and the data signal, wherein the specifying means specifies the coding rate of the control signal based on a size of the data signal before coding included in the transmission parameters, wherein the applying means calculates the coding rate of the control signal, specified by said specifying means, from a transmission data size, specified by the transmission parameters, and the size of the data signal before coding according to a rule known between said applying means and said specifying means, and wherein said specifying means estimates a size of the control signal added to transmission data to calculate the size of the data signal before coding and includes the calculated size of the data signal in the transmission parameters for transmission.

5. The wireless communication system as defined by claim 4, wherein the control signal comprises a plurality of control signals, and wherein said applying means calculates a coding rate of each control signal of the plurality of control signals, specified by said specifying means, from the transmission data size and the size of the data signal before coding according to the rule known between said applying means and said specifying means.

6. The wireless communication system as defined by claim 1, wherein said specifying means specifies the coding rate of the control signal using an index value known between said specifying means and said applying means.

7. A wireless base station device for use in a wireless communication system having an uplink for transferring data from a mobile station to a wireless base station through frequency division multiplexing, said wireless base station device comprising:

a wireless base station for specifying coding rates including a coding rate of a control signal and a coding rate of a data signal for transmission parameters in a Transmit Time Interval (TTI) scheduled in response to a transmission request from a mobile station, said coding rates of the control signal and the data signal satisfying a required reception quality defined for the control signal and the data signal, wherein said mobile station applies the coding rates to the control signal and the data signal in the TTI to generate a coded control signal and a coded data signal, and time-division multiplexes the coded control signal and the coded data signal to generate and send constant transmission-power transmission data, said coding rates being included in the transmission parameters and specified for the control signal and the data signal, wherein the wireless base station specifies the coding rate of the control signal based on a size of the data signal before coding included in the transmission parameters, wherein the mobile station calculates the coding rate of the control signal, specified by said wireless base station, from a transmission data size, specified by the transmission parameters, and the size of the data signal before coding according to a rule known between said mobile station and said wireless base station, and wherein the wireless base station estimates a size of the control signal added to transmission data to calculate the size of the data signal before coding and including the calculated size of the data signal in the transmission parameters for transmission.

8. A mobile station device for use in a wireless communication system having an uplink for transferring data from a mobile station to a wireless base station through frequency division multiplexing, said mobile station device comprising:

a mobile station for applying coding rates including a control rate applied to a control signal and a control rate applied to a data signal in a Transmit Time Interval (TTI) to generate a coded control signal and a coded data signal, the coding rates being specified by transmission parameters received from a wireless base station, time-division multiplexing the coded control signal and the coded data signal to generate constant transmission-power transmission data, and sending the generated constant transmission-power transmission data to said wireless base station, said coding rates being included in the transmission parameters and specified for the control signal and the data signal,
wherein the wireless base station specifies the coding rate of the control signal based on a size of the data signal before coding included in the transmission parameters,
wherein the mobile station calculates the coding rate of the control signal, specified by said wireless base station, from a transmission data size, specified by the transmission parameters, and the size of the data signal before coding according to a rule known between said mobile station and said wireless base station, and
wherein the wireless base station estimates a size of the control signal added to transmission data to calculate the size of the data signal before coding and including the calculated size of the data signal in the transmission parameters for transmission.

9. A wireless communication system having an uplink for transferring data from a mobile station to a wireless base station through frequency division multiplexing, said wireless communication system comprising:
a coding rate specifying unit that specifies, by a wireless base station, coding rates including a coding rate of a control signal and a coding rate of a data signal for transmission parameters in a Transmit Time Interval (TTI) scheduled in response to a transmission request from a mobile station, said coding rates of the control signal and the data signal satisfying a required reception quality defined for the control signal and the data signal; and
a coding rate applying unit that applies, by said mobile station, the coding rates to the control signal and the data signal in the TTI to generate a coded control signal and a coded data signal, time-division multiplexing the coded control signal and the coded data signal to generate constant transmission-power transmission data, and sending the generated constant transmission-power transmission data to said wireless base station, said coding rates being included in the transmission parameters and specified for the control signal and the data signal,
wherein the wireless base station specifies the coding rate of the control signal based on a size of the data signal before coding included in the transmission parameters,
wherein the mobile station calculates the coding rate of the control signal, specified by said wireless base station, from a transmission data size, specified by the transmission parameters, and the size of the data signal before coding according to a rule known between said mobile station and said wireless base station, and
wherein the wireless base station estimates a size of the control signal added to transmission data to calculate the size of the data signal before coding and including the calculated size of the data signal in the transmission parameters for transmission.

10. A wireless base station device for use in a wireless communication system having an uplink for transferring data from a mobile station to a wireless base station through frequency division multiplexing, said wireless base station device comprising:
a coding rate specifying unit that specifies coding rates including a coding rate of a control signal and a coding rate of a data signal for transmission parameters in a Transmit Time Interval (TTI) scheduled in response to a transmission request from a mobile station to generate a coded control signal and a coded data signal, said coding rates of the control signal and the data signal satisfying a required reception quality defined for the control signal and the data signal,
wherein said mobile station applies the coding rates to the control signal and the data signal in the TTI and time-division multiplexes the coded control signal and the coded data signal to generate and send constant transmission-power transmission data, said coding rates being included in the transmission parameters and specified for the control signal and the data signal,
wherein the wireless base station specifies the coding rate of the control signal based on a size of the data signal before coding included in the transmission parameters,
wherein the mobile station calculates the coding rate of the control signal, specified by said wireless base station, from a transmission data size, specified by the transmission parameters, and the size of the data signal before coding according to a rule known between said mobile station and said wireless base station, and
wherein the wireless base station estimates a size of the control signal added to transmission data to calculate the size of the data signal before coding and including the calculated size of the data signal in the transmission parameters for transmission.

11. A mobile station device for use in a wireless communication system having an uplink for transferring data from a mobile station to a wireless base station through frequency division multiplexing, said mobile station device comprising:
a coding rate applying unit that applies coding rates including a coding rate applied to a control signal and a coding rate applied to a data signal in a Transmit Time Interval (TTI) to generate a coded control signal and a coded data signal, the coding rates being specified by transmission parameters received from a wireless base station, time-division multiplexing the coded control signal and the coded data signal to generate constant transmission-power transmission data, and sending the generated constant transmission-power transmission data to said wireless base station, said coding rates being included in the transmission parameters and specified for the control signal and the data signal,
wherein the wireless base station specifies the coding rate of the control signal based on a size of the data signal before coding included in the transmission parameters,
wherein the mobile station calculates the coding rate of the control signal, specified by said wireless base station, from a transmission data size, specified by the transmission parameters, and the size of the data signal before coding according to a rule known between said mobile station and said wireless base station, and
wherein the wireless base station estimates a size of the control signal added to transmission data to calculate the size of the data signal before coding and including the calculated size of the data signal in the transmission parameters for transmission.

* * * * *